(12) United States Patent
Yang

(10) Patent No.: US 11,147,261 B2
(45) Date of Patent: Oct. 19, 2021

(54) BIDIRECTIONAL LINKAGE TYPE MOUSETRAP

(71) Applicant: Lie Yang, Dongguan (CN)

(72) Inventor: Lie Yang, Dongguan (CN)

( * ) Notice: Subject to any disclaimer, the term of this patent is extended or adjusted under 35 U.S.C. 154(b) by 237 days.

(21) Appl. No.: 16/556,259

(22) Filed: Aug. 30, 2019

(65) Prior Publication Data

US 2021/0059237 A1    Mar. 4, 2021

(51) Int. Cl.
*A01M 23/24* (2006.01)
*A01M 23/18* (2006.01)

(52) U.S. Cl.
CPC .................................... *A01M 23/18* (2013.01)

(58) Field of Classification Search
CPC ...... A01M 23/18; A01M 23/20; A01M 23/24; A01M 23/26
USPC .......................... 43/61, 63, 74, 79, 81, 88, 90
See application file for complete search history.

(56) References Cited

U.S. PATENT DOCUMENTS

| 222,520 | A | * | 12/1879 | Marti | ...................... | A01M 23/18 43/61 |
| 2,038,068 | A | * | 4/1936 | Wagner | .................. | A01M 23/18 43/61 |
| 2,232,604 | A | * | 2/1941 | Helmick | ............... | A01M 23/18 43/61 |
| 2,540,418 | A | * | 2/1951 | Bird | ....................... | A01M 23/20 43/61 |
| 4,688,348 | A | * | 8/1987 | Chu | ........................ | A01M 23/18 43/61 |
| 7,596,902 | B2 | * | 10/2009 | Han | ....................... | A01M 23/20 43/61 |

* cited by examiner

*Primary Examiner* — Peter M Poon
*Assistant Examiner* — Danielle A Clerkley

(57) ABSTRACT

The present disclosure provides a bidirectional linkage type mousetrap including: a base, an upper shell, a first pedal, a second pedal, clamping shafts, and torsion springs. A bait placing cup and clamping frames are arranged on the base. Each clamping frame includes side plates and a clamping rack. Each of the first pedal and the second pedal includes a touch portion, a clamping shaft accommodating groove, and a clamping shaft buckle. Mousetrap inlets are arranged on two ends of the upper shell respectively. The mousetrap has two inlets and two-way linkage, which increase the probability of catching a mouse.

9 Claims, 8 Drawing Sheets

BIDIRECTIONAL LINKAGE TYPE MOUSETRAP

TECHNICAL FIELD

The present disclosure relates to a field of mousetrap technology, and in particular to a bidirectional linkage type mousetrap.

BACKGROUND

A conventional mousetrap generally includes a bottom plate, a clip arranged on the bottom plate, and a trigger plate. When a mouse steps on the trigger plate, the clip closes immediately to capture the mouse. However, such a mousetrap is easy to clip to pets and children because it has no protective cover.

For this reason, there are also some mousetraps with protective shells on the market. Mouse clips are installed inside the protective shell. When the mouse enters into the protective shell and touches the mousetrap, it is captured by the mousetrap. However, existing mousetraps have the following disadvantages: 1. The mousetrap generally only includes one inlet, which reduces probability of catching mice, and efficiency of catching mice is not high. 2. When the mouse enters the mouse clap, it can only trap the mouse, but not kill the mouse by trapping. 3. When the mouse is captured, the mousetrap is not able to remind a user, moreover, only when a body of the mouse stinks, the user knows that the mouse is captured and dead, which affects the user's use.

SUMMARY

An object of the present disclosure is to overcome the above-mentioned deficiencies in the prior art. And the present disclosure provides a bidirectional linkage type mousetrap, which includes a novel mouse clipping structure having double inlets and two-way linkage and convenient to use. The bidirectional linkage type mousetrap increases a probability of catching mice. And the present disclosure is able to kill mice and remind users.

To achieve the above object, the present disclosure provides the bidirectional linkage type mousetrap including a base, an upper shell, a first pedal, a second pedal, clamping shafts, and torsion springs. A bait placing cup is arranged on an upper surface of the base.

Two clamping frames are arranged on two sides of the bait placing cup. Each clamping frame includes two side plates that are symmetrically-arranged and a clamping rack configured to clamp a mouse in conjunction with the clamping shaft, each clamping rack includes teeth facing downward.

Each clamping rack is connected with the two side plates corresponding to each clamping rack and arranged between top portions of the two side plates corresponding to each clamping rack. Each of the side plates is provided with a movable guide hole that is longitudinally-arranged. A torsion spring installation head is arranged on an outer surface of each of the side plates.

The first pedal and the second pedal are rotatably connected to two ends of the base. Each of the first pedal and the second pedal is arranged between the corresponding two side plates of the clamping frames. Each of the first pedal and the second pedal is flippable up and down relative to the base. A first touch portion is arranged on an inward end of the first pedal. The first touch portion of the first pedal is configured to touch the second pedal to make the second pedal flip in conjunction with the first pedal. A second touch portion is arranged on an inward end of the second pedal. The second touch portion of the second pedal is configured to touch the first pedal to make the first pedal flip in conjunction with the second pedal.

Two ends of each clamping shaft are connected with an inner wall of the upper shell respectively after passing through the movable guide holes of the two side plates corresponding to the clamping shaft. Each clamping shaft located directly below a corresponding clamping rack.

The torsion springs are arranged on an outer side of the side plates of the two clamping frames. Two ends of each torsion spring are wound into a ring shape respectively. One end of each torsion spring is sleeved on the corresponding clamping shaft. Another end of each torsion spring is sleeved on the torsion spring installation head of the corresponding side plate. Mousetrap inlets are arranged on two ends of the upper shell respectively. A discharge opening is arranged on a position of the upper shell corresponding to the bait placing cup. A flip cover, rotatably connected with the upper shell, is arranged on the discharge opening. The upper shell and the clamping shafts are moveable up and down relative to the base.

Optionally, the first touch portion of the first pedal is set as a first touch arm. The first touch arm of the first pedal extends to the second pedal. The first touch arm is arranged on a side of the inward end of the first pedal. The second touch portion of the second pedal is set as a second touch arm. The second touch arm of the second pedal extends to the first pedal. The second touch arm is arranged on a side of the inward end of the second pedal; a first touch convex body is arranged on another side of the inward end of the first pedal. The first touch convex body of the first pedal is configure to contact the second touch arm of the second pedal. And a second touch convex body is arranged on another side of the inward end of the second pedal. The second touch convex body of the second pedal is configure to contact the first touch arm of the first pedal.

Optionally, two pedal rotating shafts are arranged on two ends of the base respectively. Each of the pedal rotating shafts is located between the two side plates of the corresponding clamping frame. A rotating shaft clamping groove is arranged on a bottom of each of the first pedal and the second pedal. Each of the first pedal and the second pedal is rotatably connected with the corresponding pedal rotating shaft by the corresponding rotating shaft clamping groove.

Optionally, a counterweight block is arranged on a bottom of an outward end of each of the first pedal and the second pedal. The counterweight blocks are configured to automatically reset the first pedal and the second pedal.

Optionally, press portions are respectively arranged on two ends of a top portion of the upper shell. The press portions include a plurality of anti-sliding protruding points.

Optionally, an intermediate position of a top portion of the upper shell has a concave curved structure, so that an inner cavity space of the upper shell is gradually reduced toward middle.

Optionally, two blind holes are arranged on a side of an inner wall of the upper shell. Two through holes are arranged on another side of the inner wall of the upper shell. One end of each clamping shaft is arranged in the corresponding blind hole. Another end of each clamping shaft is arranged in the corresponding through hole. End cap buckles are respectively arranged on a position of an outer wall of the upper shell corresponding to the two through holes. Each of the end cap buckles is engaged with one plug end cap. Each plug end cap presses the another of each clamping shaft to limit a position of each clamping shaft.

Optionally, a flip cover shaft is arranged on one end of the discharge opening of the upper shell. A flip cover shaft clamping groove is arranged on one end of the flip cover. And the flip cover is rotatably connected with the flip cover shaft by the flip cover shaft clamping groove.

Optionally, an elastic buckle configured to engage with the upper shell is arranged on the other end of the flip cover.

The present disclosure is with novel structure and is convenient to use. The present disclosure is a clamping mechanism having two inlets and two-way linkage. When the mouse enters from any one of the inlets, one of the first pedal and the second pedal is touched, and the clamping shafts are released from limitation of the clamping shaft buckles arranged on the first pedal and the second pedal. And the clamping shafts bounces up under an elastic action of the torsion springs and clamps and kills the mouse with the clamping racks. The present disclosure greatly increase the probability of catching the mouse and has high efficiency.

When the mouse is captured, the upper shell bounces up along with the clamping shafts, so that the user judges whether the mouse is captured according to a position of the upper shell. The present disclosure is with reminder function and is convenient for users to use.

The upper shell of the present disclosure is easy to reset, and when the mouse is clipped and killed, the mouse is easily pulled out by simply pressing the upper shell to make the clamping shafts to move downwards.

DETAILED DESCRIPTION

Figure 1:
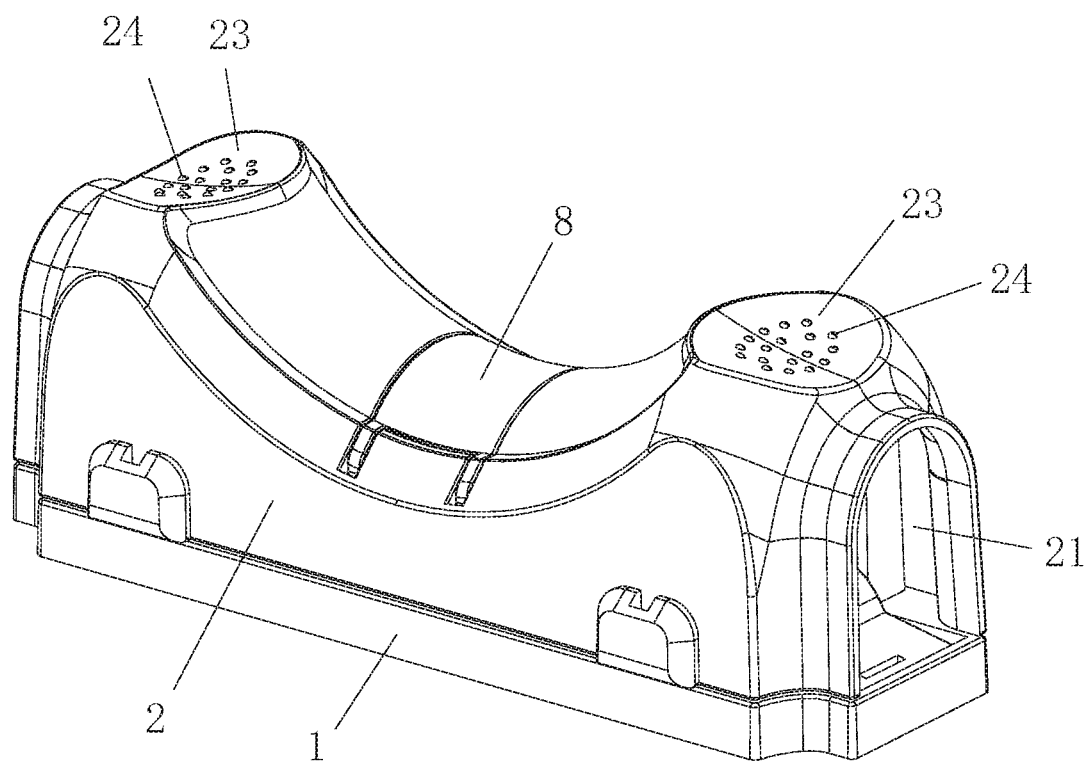
FIG. 1 is a structure schematic diagram of a bidirectional linkage type mousetrap of the present disclosure.
Figure 2:
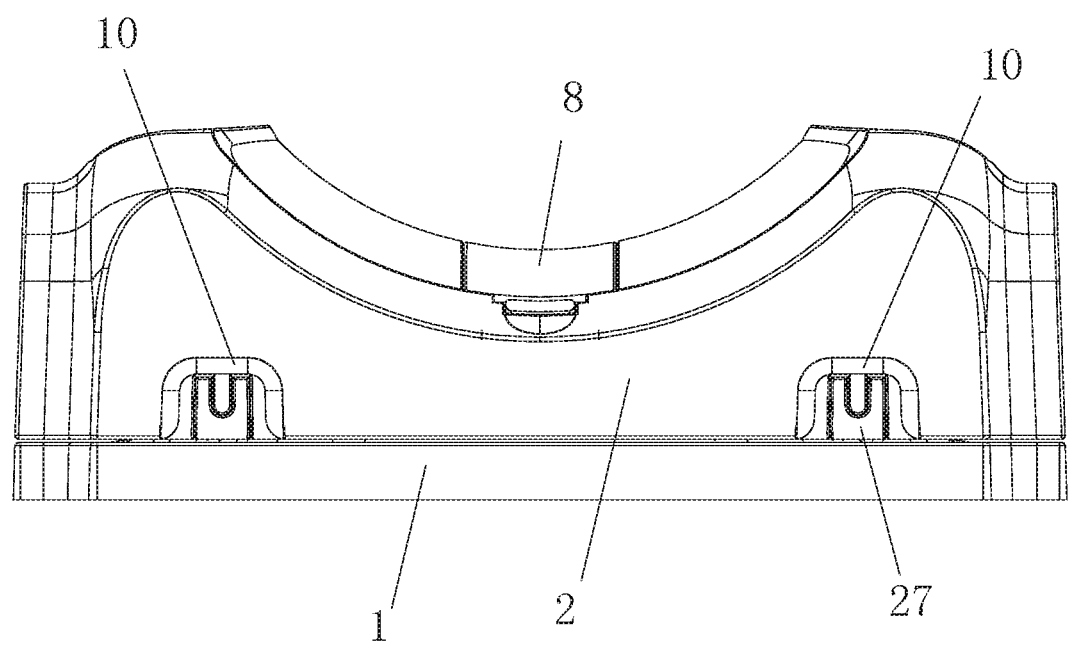
FIG. 2 is a side schematic diagram of the bidirectional linkage type mousetrap of the present disclosure.

As shown in FIGS. 1-4, one embodiment of the present disclosure provides a bidirectional linkage type mousetrap including: a base 1, an upper shell 2, a first pedal 3a, a second pedal 3b, two clamping shafts 4, and four torsion springs 5, etc. Components of this embodiment will be described in detail below with reference to the accompanying drawings.

Figure 3:
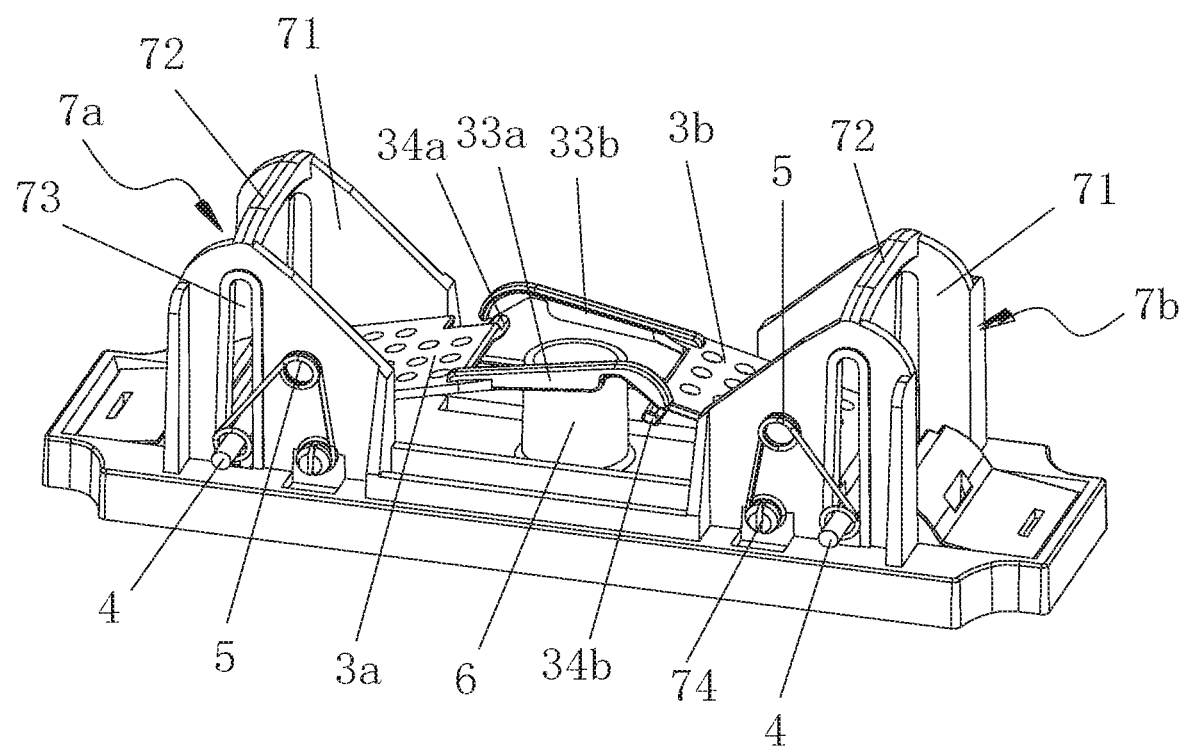
FIG. 3 is a first schematic diagram of internal structures of the bidirectional linkage type mousetrap of the present disclosure.
Figure 4:
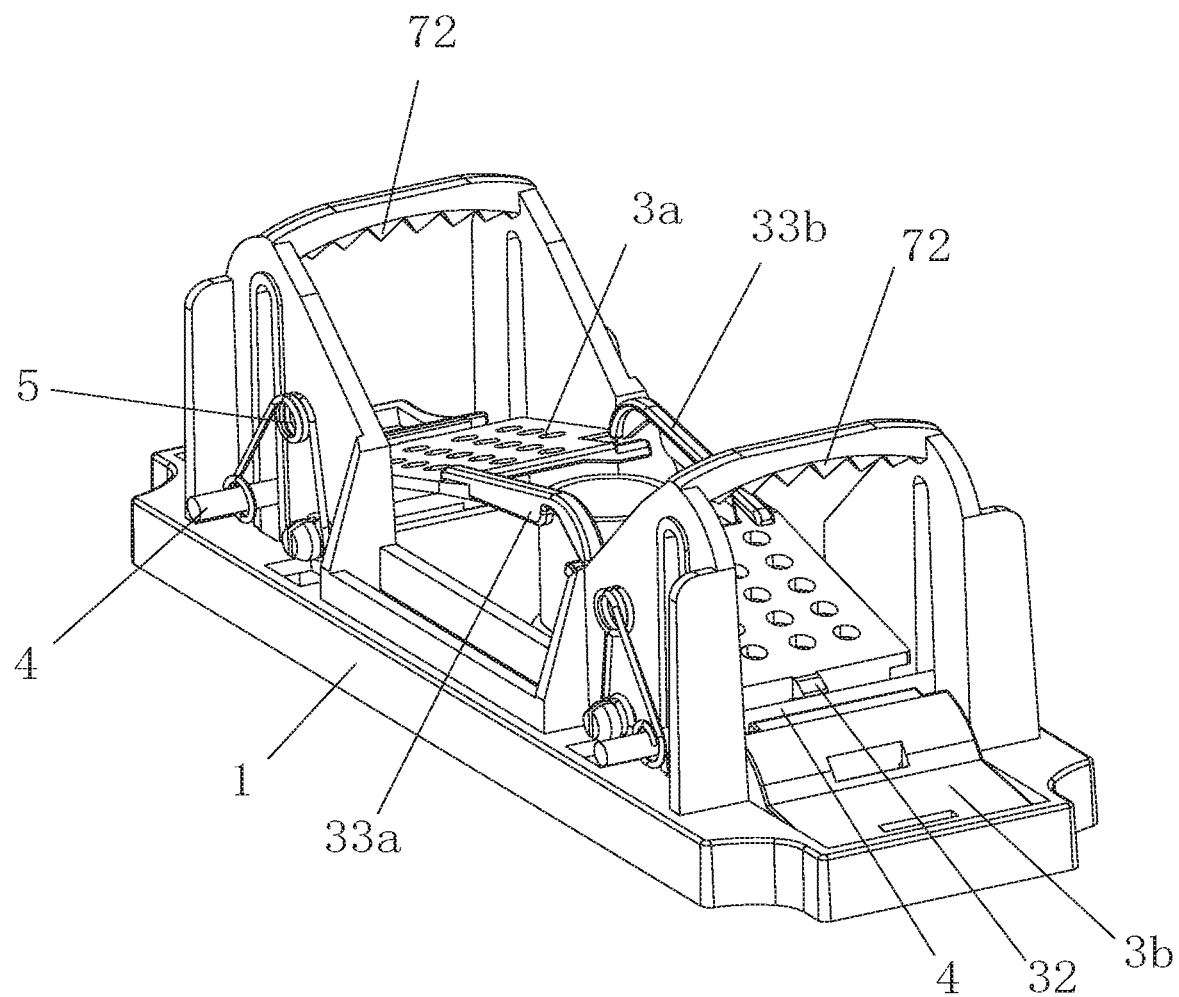
FIG. 4 is a second schematic diagram of the internal structures of the bidirectional linkage type mousetrap of the present disclosure.
Figure 5:
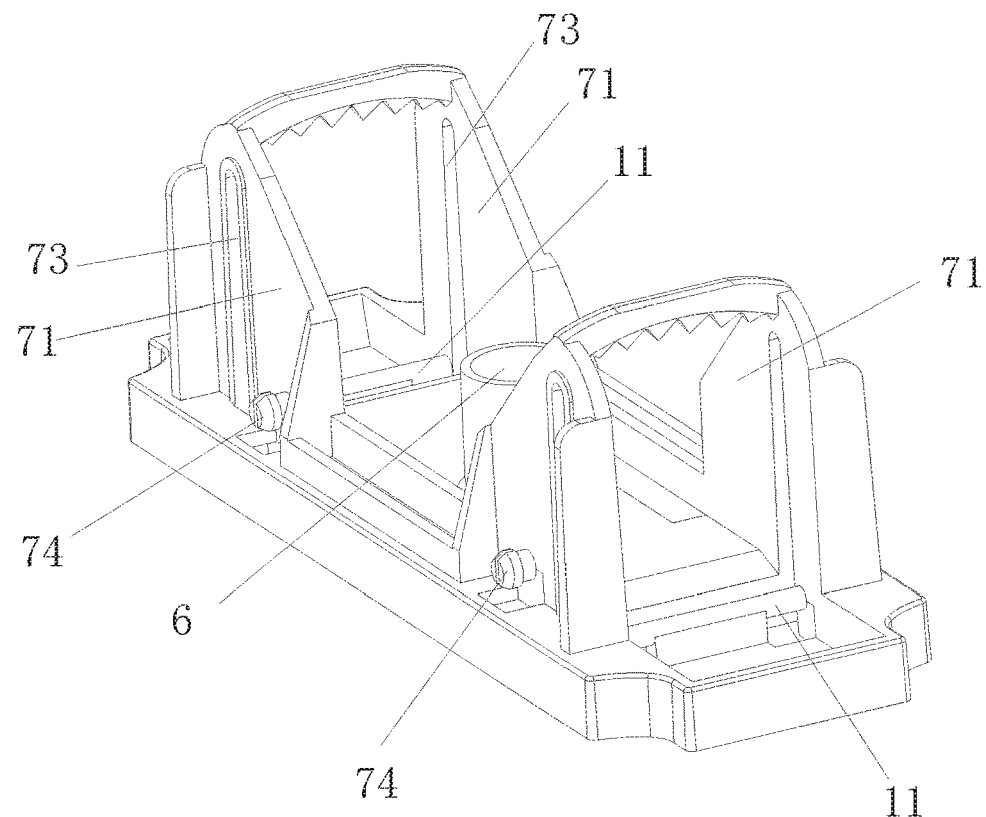
FIG. 5 is a structure schematic diagram of a base and structures connected with the base.

As shown in FIGS. 3-5, a cylindrical bait placing cup 6 is arranged on an upper surface of the base 1. Two clamping frames 7a, 7b are arranged on two sides of the bait placing cup 6. Each of the clamping frames 7a, 7b includes two side plates 71 that are symmetrically-arranged and a clamping rack 72 configured to clamp a mouse in conjunction with the clamping shaft 4. Each clamping rack 72 is connected with the corresponding two side plates 71 and is arranged between top portions of the two side plates 71. And each clamping rack 72 includes teeth facing downward. Each of the side plates 71 is provided with a movable guide hole 73 that is longitudinally-arranged. The movable guide holes 73 are configured to limit a movement of the clamping shafts, so that the clamping shafts only move up and down. A torsion spring installation head 71 is arranged on an outer surface of each of the side plates 71.

Figure 7:
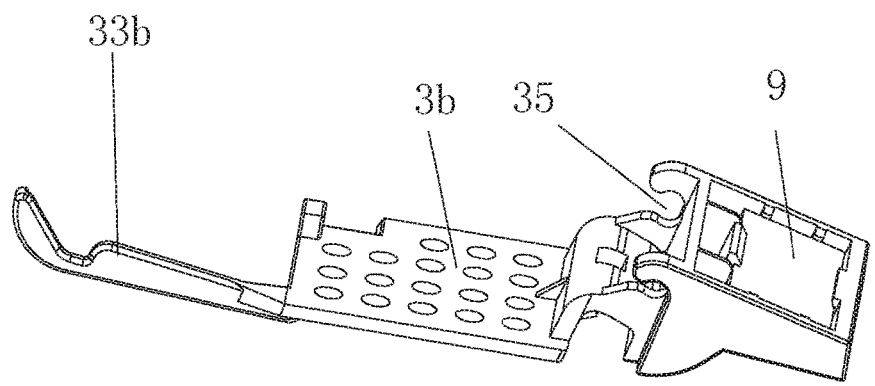
FIG. 7 is a second structure schematic diagram of the second pedal.

As shown in FIGS. 3-4, the first pedal 3a is rotatably connected to one end of the base land. And the first pedal 3a is arranged between two side plates 71 of the clamping frame 7a. The second pedal 3b is rotatably connected to the other end of the base 1. The second pedal 3b is arranged between two side plates 71 of the clamping frame 7b. Each of the first pedal 3a and the second pedal 3b is able to be flipped up and down relative to the base 1. In the embodiment, as shown in FIGS. 5 and 7, the two ends of the base 1 respectively include a pedal rotating shaft 11 arranged between the two side plates 71 of each of the clamping frames 7a, 7b. A rotating shaft clamping groove 35 adapted to a shape of the pedal rotating shaft 71 is arranged on a bottom portion of each of the first pedal 3a and the second pedal 3b. The first pedal 3a and the second pedal 3b are respectively rotatably connected with their corresponding pedal rotating shaft 11 by the corresponding rotating shaft clamping groove 35. Of course, in another embodiment, the bottom portion of each of the first pedal 3a and the second pedal 3b includes a mounting hole. Each pedal rotating shaft passing through the corresponding mounting hole of each of the first pedal 3a and the second pedal 3b is arranged on the base. Thus, the first pedal 3a and the second pedal 3b are respectively rotatably connected with the base 1.

Figure 6:
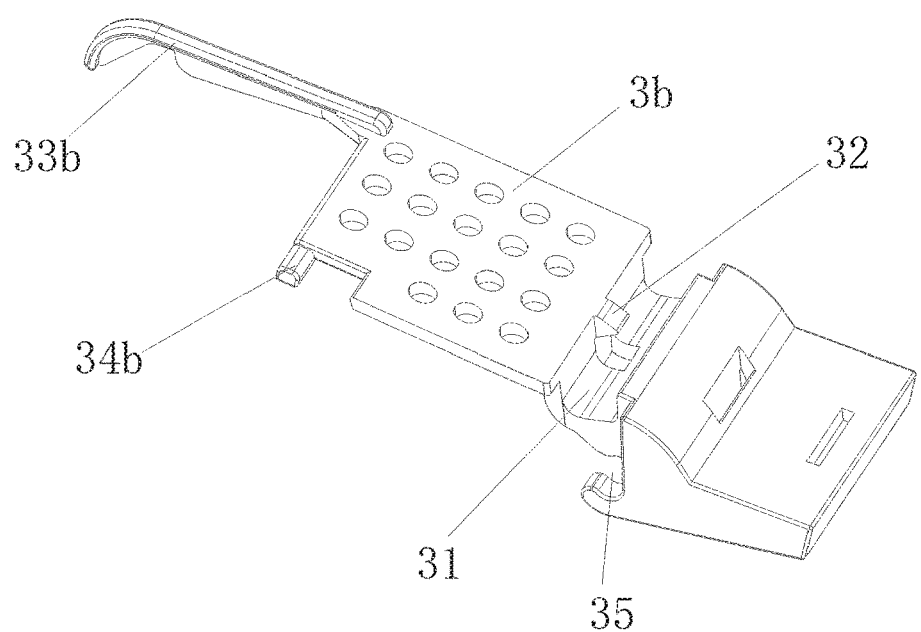
FIG. 6 is a first structure schematic diagram of a second pedal.

As shown in FIGS. 6 and 7, a first touch portion is arranged on an inward end of the first pedal 3a. The first touch portion of the first pedal 3a is configured to touch the second pedal 3b to make the second pedal 3b to flip in conjunction with the first pedal 3a. And a second touch portion is arranged on an inward end of the second pedal 3b. The second touch portion of the second pedal 3b is configured to touch the first pedal 3a to make the second pedal 3b to flip in conjunction with the first pedal 3a. Optionally, the first touch portion of the first pedal 3a is set as a first touch arm 33a. The first touch arm 33a of the first pedal 3a extends to the second pedal 3b. The first touch arm 33a is arranged on a side of the inward end of the first pedal 3a. The second touch portion of the second pedal 3b is set as a second touch arm 33b. The second touch arm 33b of the second pedal 3b extends to the first pedal 3a. The second touch arm 33b is arranged on a side of the inward end of the second pedal 33b. A first touch convex body is arranged on another side of the inward end of the first pedal. The first touch convex body 34a of the first pedal 3a is configure to contact the second touch arm 33b of the second pedal 3b. And a second touch convex body 34b is arranged on another side of the inward end of the second pedal 3b. The second touch convex body 34b of the second pedal 3b is configure to contact the first touch arm 33a of the first pedal 3a.

In addition, each of the first pedal 3a and the second pedal 3b includes a clamping shaft accommodating groove 31 and a clamping shaft buckle 32 arranged in the clamping shaft accommodating groove 31. The clamping shaft accommodating groove 31 is configured to accommodate the clamping shaft 4, and the clamping shaft buckle 32 is configured to clamp the clamping shaft 4 to prevent the clamping shaft 4 from bouncing up.

In the embodiment, the first pedal 3a and the second pedal 3b adopt the principle of leverage, and a weight of an outward end of each of the first pedal 3a and the second pedal 3b is greater than a weight of the inward end of each of the first pedal 3a and the second pedal 3b, so that the first pedal 3a and the second pedal 3b maintain a tilted state toward the inward ends of the first pedal 3a and the second pedal 3b, when the first pedal 3a and the second pedal 3b are in a normal state. Of course, according to actual needs, optionally, a counterweight block 9 (such as an iron block) is arranged on a bottom of the outward end of each of the first pedal 3a and the second pedal 3b to automatically reset the first pedal 3a and the second pedal 3b.

As shown in FIGS. 3 and 4, each clamping shaft 4 is movably arranged in the movable guide holes 73 arranged on the two side plates 71 of the corresponding clamping frames 7a, 7b. Two ends of each clamping shaft 4 are connected with an inner wall of the upper shell 2 respectively after passing through the movable guide holes 73 of the two side plates 71 corresponding to the clamping shaft 4. Each clamping shaft 4 is located directly below the corresponding clamping rack 72. Optionally, each clamping shaft 4 is a metal shaft body such as an iron shaft or the like.

As shown in FIGS. 3 and 4, the torsion springs 5 are arranged on an outer side of the side plates 71 of the two clamping frames 7a, 7b. Two ends of each torsion spring 5 are wound into a ring shape respectively. One end of each torsion spring 5 is sleeved on the corresponding clamping shaft 4. The other end of each torsion spring 5 is sleeved on the torsion spring installation head 74 of the corresponding side plate 71.

Figure 8:
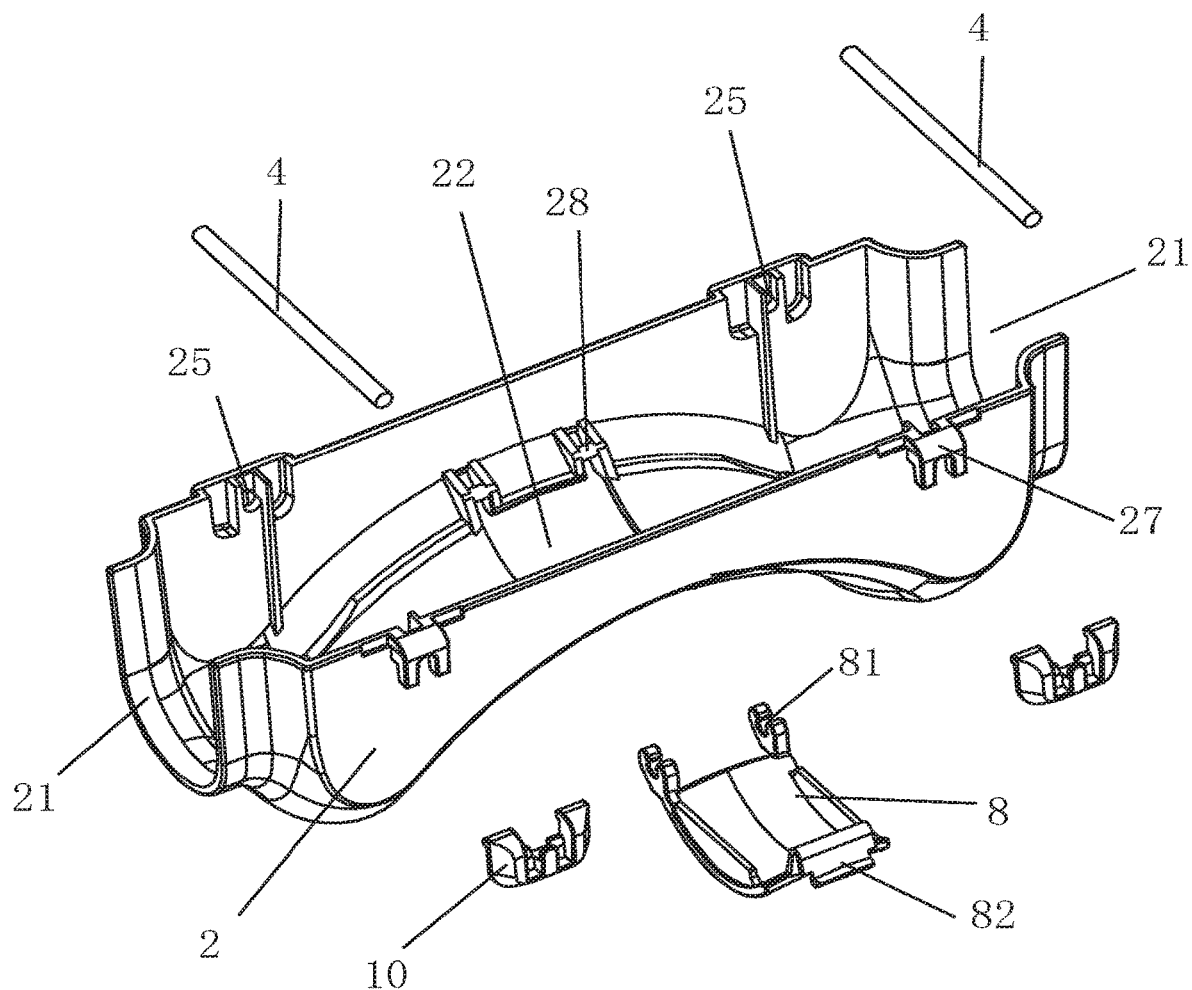
FIG. 8 is a structure schematic diagram of an upper shell and structures connected with the upper shell.
Figure 9:
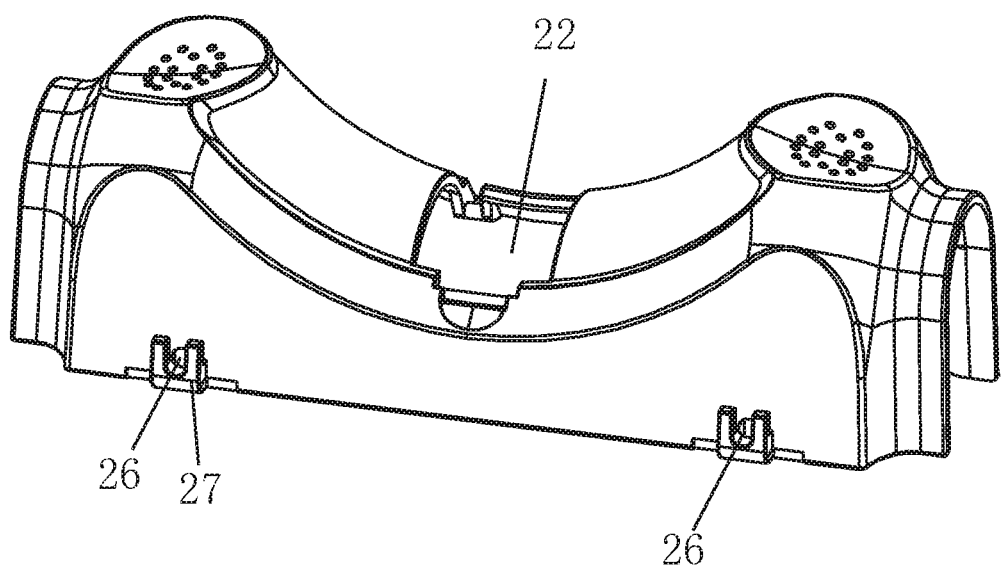
FIG. 9 is a structure schematic diagram of the upper shell.
Figure 10:
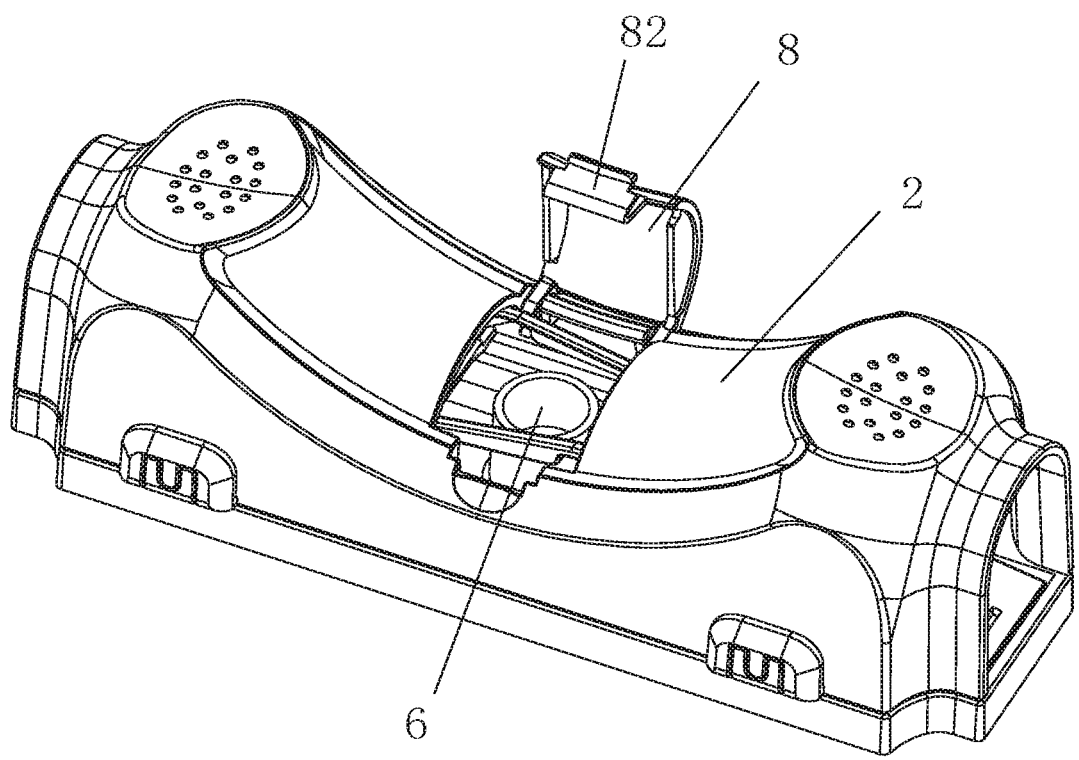
FIG. 10 is a structure schematic diagram of the bidirectional linkage type mousetrap where a flip cover is open.

As shown in FIGS. 8 and 9, two mousetrap inlets 21 are arranged on two ends of the upper shell 2 respectively. A discharge opening 22 is arranged on a position of the upper shell 2 corresponding to the bait placing cup 6. A flip cover 8 rotatably connected with the upper shell 2 is arranged on the discharge opening 22. A flip cover shaft clamping groove 81 is arranged on one end of the flip cove 8. A flip cover shaft 28 is arranged on one end of the discharge opening 22 of the upper shell 2. And the flip cover 8 is rotatably connected with the flip cover shaft 28 by the flip cover shaft clamping groove 81. As shown in FIG. 10, when it is necessary to place baits in the bait placing t cup 6, the flip cover 8 is opened, and the flip cover 8 is closed after the baits are placed.

Optionally, in order to facilitate the flip cover 8 to open and close, an elastic buckle 82 configured to engage with the upper shell 2 is arranged on the other end of the flip cover 8.

As shown in FIG. 1, press portions 23 are respectively arranged on two ends of a top portion of the upper shell 2. The press portions 23 includes a plurality of anti-sliding protruding points. In operation, the user can simultaneously press the press portions 23 of the upper shell 2 with thumbs of both hands, and then press the upper shell 2 downward to close. And the clamping shafts 4 are engaged with the clamping shaft accommodating grooves 31 of the first pedal 3a ad the second pedal 3b, so that the clamping shaft buckles 32 clamp the clamping shafts 4.

As shown in FIGS. 8 and 9, in order to facilitate an installation and disassembly of the clamping shaft 4, two blind holes 25 are arranged on a side of an inner wall of the upper shell 2. Two through holes 26 are arranged on the other side of the inner wall of the upper shell 2. One end of each clamping shaft 4 is arranged in the corresponding blind hole 25. The other end of each clamping shafts 4 is arranged in the corresponding through hole 26. End cap buckles 27 are respectively arranged on a position of an outer wall of the upper shell 2 corresponding to the two through holes 26. Each of the end cap buckles 27 is engaged with a plug end cap 10. Each plug end cap presses the other end of each clamping shaft to limit a position of each clamping shaft. When each clamping shaft 4 is mounted to the corresponding hole, the plug end cap 10 is mounted, and the plug end cap 10 press the other end of each clamping shaft 4 to limit the position of the clamping shafts 4. When the plug end cap 10 is removed, the clamping shafts 4 are able to be pulled out from the through holes 26.

Optionally, an intermediate position of a top portion of the upper shell 2, that is, a position between the two press portion 23 has a concave curved structure, so that an inner cavity space of the upper shell is gradually reduced toward middle. This structure better forces the mouse to press one pedal 3, which is advantageous for trapping the mouse, and also enables the discharge opening 22 of the upper shell 2 to be positioned closer to the bait placing cup 6, which facilitates a placement of the baits.

A working principle of the present disclosure is as follows:

In use, the user can press the upper shell 2, so that the upper shell 2 is closed with the base 1, and the two clamping shafts 4 are respectively engaged in the clamping shaft accommodating grooves 31 of the first pedal 3a and the second pedal 3b, and the clamping shaft buckles 32 clamps the clamping shafts 4, which restrict the clamping shafts 4 and the upper shell 2 from bouncing upward. At this time, the torsion springs 5 are compressed, the inward ends of the first pedal 3a and the second pedal 3b are tilted upward, the first pedal 3a and the second pedal 3b are tilted, and the mousetrap is in a configuration of use, as shown in FIG. 1.

Figure 11:
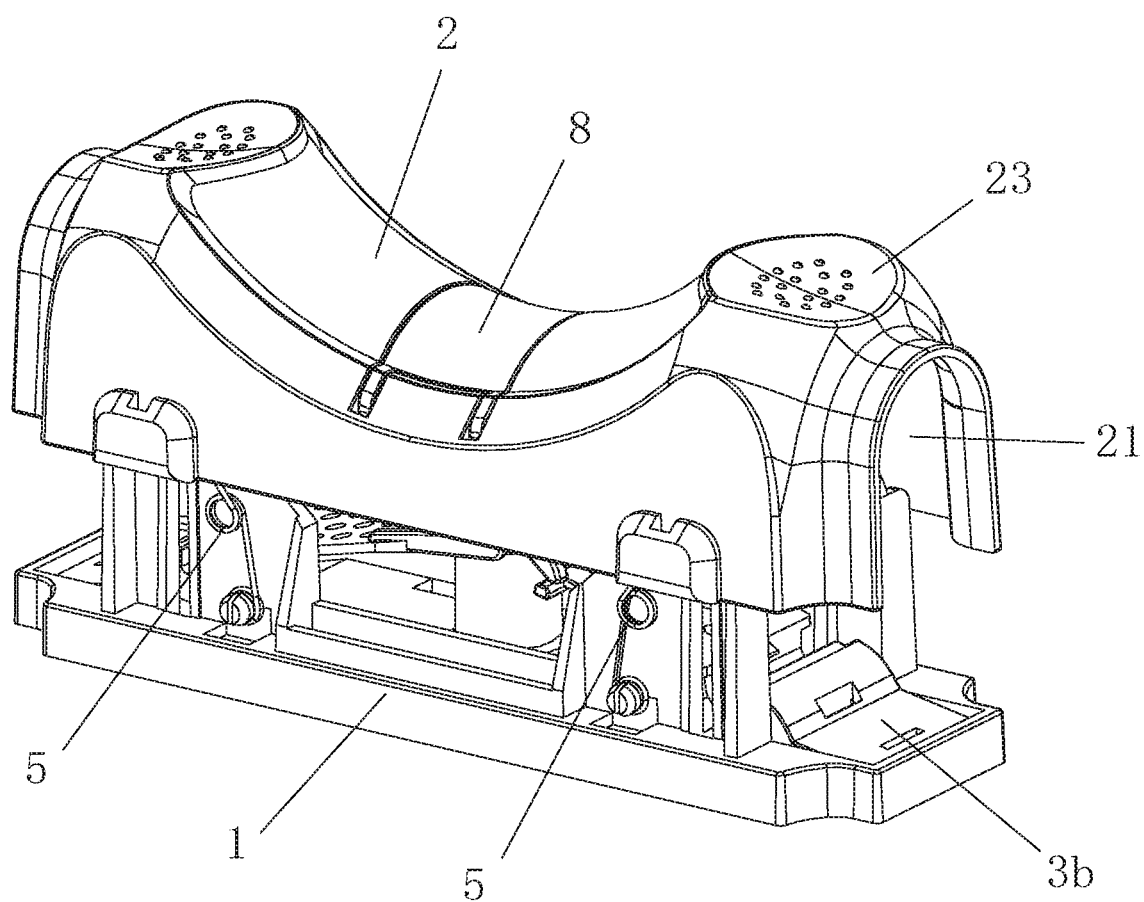
FIG. 11 is a structure schematic diagram of the bidirectional linkage type mousetrap where the upper shell is bounced up.
Figure 12:
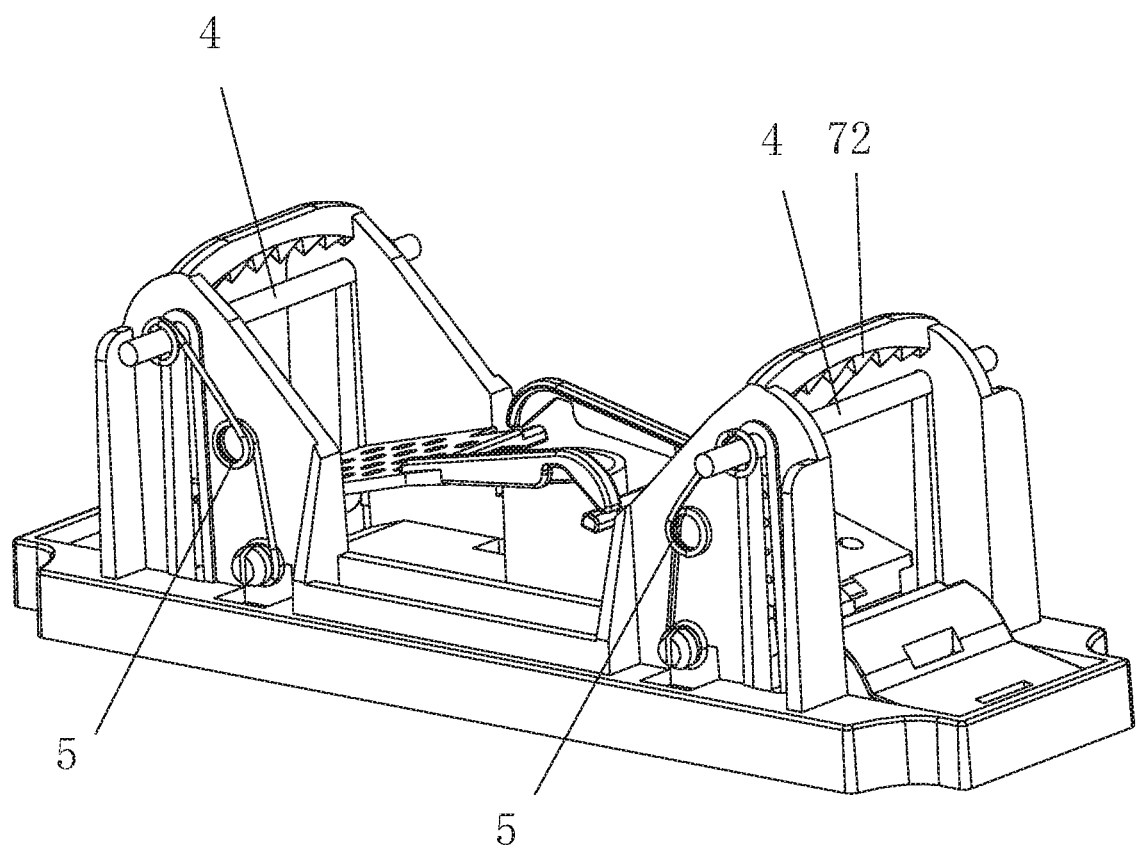
FIG. 12 is a structure schematic diagram of the internal structures of the bidirectional linkage type mousetrap where the clamping shafts are bounced up.

When the mouse enters from any of the two mousetrap inlets 21, the mouse presses one of the first pedal 3a or the second pedal 3b that is corresponding to the mousetrap inlet, e. g., the mouse enters from one inlet corresponding to the first pedal 3a, and steps on the first pedal 3a. At this time, the first pedal 3a simultaneously presses down the second pedal 3b on the other side to achieve linkage. When the first pedal 3a and the second pedal 3b are depressed and flipped, the clamping shaft buckles 32 of the first pedal 3a and the second pedal 3b unwind the restriction on the clamping shafts 4, and under elastic reset of the torsion springs 5, the clamping shafts 4 and the upper shell 2 are bounced upward. the clamping shafts 4 are engaged with the corresponding clamping racks 72 to clip the mouse until the mouse is killed, as shown in FIGS. 11 and 12.

When the mouse is killed, as long as the upper shell 2 is pressed, the clamping shafts 4 are moved downward to facilitate pulling out the mouse.

In summary, the present disclosure is with novel structure and is convenient to use. The present disclosure is a clamping mechanism having two inlets and two-way linkage, which increase the probability of catching the mouse and is able to kill the mouse, and has high efficiency. The user is able to judge whether the mouse is captured according to the position of the upper shell, that is, the present disclosure has a reminder function.

The above embodiments are optional embodiments of the present disclosure, it should be understood that the embodiments of the present disclosure are not limited to the above embodiments, and any other changes, modifications, substitutions, combinations, and combinations thereof may be made without departing from the spirit and scope of the present disclosure should all be equivalent replacements and are included in the scope of the present disclosure.

What is claimed is:

1. A bidirectional linkage type mousetrap, comprising:
a base, an upper shell, a first pedal, a second pedal, clamping shafts, and torsion springs; wherein a bait placing cup is arranged on an upper surface of the base;
two clamping frames arranged on two sides of the bait placing cup; each clamping frame comprising two side plates that are symmetrically-arranged and a clamping rack configured to clamp a mouse in conjunction with the clamping shaft; each clamping rack comprising teeth facing downward;
each clamping rack connected with the two side plates corresponding to each clamping rack and arranged between top portions of the two side plates corresponding to each clamping rack;
each of the side plates provided with a movable guide hole that is longitudinally-arranged;
a torsion spring installation head arranged on an outer surface of each of the side plates;
the first pedal and the second pedal are rotatably connected to two ends of the base; each of the first pedal and the second pedal is arranged between the corresponding two side plates of the clamping frames; each of the first pedal and the second pedal flippable up and down relative to the base; a first touch portion is arranged on an inward end of the first pedal; the first touch portion of the first pedal is configured to touch the second pedal to make the second pedal flip in conjunction with the first pedal; a second touch portion is arranged on an inward end of the second pedal; the second touch portion of the second pedal is configured to touch the first pedal to make the first pedal flip in conjunction with the second pedal;
each of the first pedal and the second pedal comprising a clamping shaft accommodating groove and a clamping shaft buckle arranged in the clamping shaft accommodating groove; each clamping shaft is movably arranged in the corresponding movable guide holes arranged on the two side plates of the clamping frames;
two ends of each clamping shaft are connected with an inner wall of the upper shell respectively after passing through the movable guide holes of the two side plates corresponding to the clamping shaft; each clamping shaft located directly below a corresponding clamping rack;
the torsion springs are arranged on an outer side of the side plates of the two clamping frames; two ends of each torsion spring are wound into a ring shape respectively; a first end of each torsion spring is sleeved on the corresponding clamping shaft; a second end of each torsion spring is sleeved on the torsion spring installation head of the corresponding side plate;
mousetrap inlets arranged on two ends of the upper shell respectively;
a discharge opening arranged on a position of the upper shell corresponding to the bait placing cup; and
a flip cover, rotatably connected with the upper shell, being arranged on the discharge opening;
wherein the upper shell and the clamping shafts are moveable up and down relative to the base.

2. The bidirectional linkage type mousetrap according to claim 1, wherein the first touch portion of the first pedal is set as a first touch arm; the first touch arm of the first pedal extends to the second pedal; the first touch arm is arranged on a side of the inward end of the first pedal; the second touch portion of the second pedal is set as a second touch arm; the second touch arm of the second pedal extends to the first pedal; the second touch arm is arranged on a side of the inward end of the second pedal; a first touch convex body is arranged on another side of the inward end of the first pedal; the first touch convex body of the first pedal is configured to contact the second touch arm of the second pedal; and a second touch convex body is arranged on another side of the inward end of the second pedal; the second touch convex body of the second pedal is configured to contact the first touch arm of the first pedal.

3. The bidirectional linkage type mousetrap according to claim 1, wherein pedal rotating shafts are arranged on the two ends of the base respectively; each of the pedal rotating shafts is located between the two side plates of the corresponding clamping frame; a rotating shaft clamping groove is arranged on a bottom of each of the first pedal and the second pedal, each of the first pedal and the second pedal is rotatably connected with the corresponding pedal rotating shaft by the corresponding rotating shaft clamping groove.

4. The bidirectional linkage type mousetrap according to claim 1, wherein a counterweight block is arranged on a bottom of an outward end of each of the first pedal and the second pedal; the counterweight blocks are configured to automatically reset the first pedal and the second pedal.

5. The bidirectional linkage type mousetrap according to claim 1, wherein press portions are respectively arranged on two ends of a top portion of the upper shell; the press portions comprise a plurality of anti-sliding protruding points.

6. The bidirectional linkage type mousetrap according to claim 1, wherein an intermediate position of a top portion of the upper shell has a concave curved structure, so that an inner cavity space of the upper shell is gradually reduced toward middle.

7. The bidirectional linkage type mousetrap according to claim 1, wherein two blind holes are arranged on a side of an inner wall of the upper shell; two through holes are arranged on another side of the inner wall of the upper shell; one end of each clamping shaft is arranged in the corresponding blind hole; another end of each clamping shaft is arranged in the corresponding through hole; end cap buckles are respectively arranged on a position of an outer wall of the upper shell corresponding to the two through holes; each of the end cap buckles is engaged with one plug end cap; each plug end cap presses the another of each clamping shaft to limit a position of each clamping shaft.

8. The bidirectional linkage type mousetrap according to claim 1, wherein a flip cover shaft is arranged on one end of the discharge opening of the upper shell; a flip cover shaft clamping groove is arranged on a first end of the flip cover; and the flip cover is rotatably connected with the flip cover shaft by the flip cover shaft clamping groove.

9. The bidirectional linkage type mousetrap according to claim 8, wherein an elastic buckle configured to engage with the upper shell is arranged on a second end of the flip cover.

* * * * *